United States Patent [19]

Frederick

[11] Patent Number: 4,614,161
[45] Date of Patent: Sep. 30, 1986

[54] STATOR COIL LACING CORD SECURING APPARATUS AND METHOD

[75] Inventor: Robert E. Frederick, Garden City, Mich.

[73] Assignee: Link Engineering Company, Detroit, Mich.

[21] Appl. No.: 717,831

[22] Filed: Mar. 29, 1985

[51] Int. Cl.[4] .............................................. D05B 3/00
[52] U.S. Cl. .................................. 112/121.2; 29/596; 140/101
[58] Field of Search .................. 29/596, 732; 66/1 R; 112/2, 121.2, 121.11; 140/101

[56] References Cited

U.S. PATENT DOCUMENTS

| | | |
|---|---|---|
| 3,323,558 | 6/1967 | Collins . |
| 3,338,273 | 8/1967 | Kalning . |
| 3,342,223 | 9/1967 | Hall et al. . |
| 3,344,760 | 10/1967 | Muskulus et al. ................ 112/121.2 |
| 3,344,813 | 10/1967 | Kaiser . |
| 3,685,470 | 8/1972 | Frederick ......................... 112/121.2 |
| 3,844,235 | 10/1974 | Habegger .......................... 112/121.2 |
| 3,862,493 | 1/1975 | Habegger et al. ............... 112/121.2 |
| 3,985,162 | 10/1976 | Redman . |
| 4,107,592 | 8/1978 | Bayer ......................... 112/121.11 X |
| 4,156,443 | 5/1979 | Nishikawa et al. . |
| 4,312,283 | 1/1982 | Fischer et al. ................. 112/121.12 |
| 4,412,163 | 10/1983 | Angersbach et al. ..... 112/121.11 X |

*Primary Examiner*—Werner H. Schroeder
*Assistant Examiner*—Andrew M. Falik
*Attorney, Agent, or Firm*—Harness, Dickey & Pierce

[57] ABSTRACT

A stator coil lacing machine apparatus and method which enables the end windings of a stator to be bound together by lacing cord and which automatically ties a knot in the cord at the completion of the cycle to firmly secure the lacing cord in position. This method and apparatus reduces the direct labor necessary to produce the end windings and provides them in an automated and efficient manner. The lacing cord end securing knot is provided through a control system which actuates a lacing needle and cord supply tube which, with cord cutting hot wires and cord grasping jaws, interact to form a knot at the completion of the lacing cycle.

13 Claims, 12 Drawing Figures

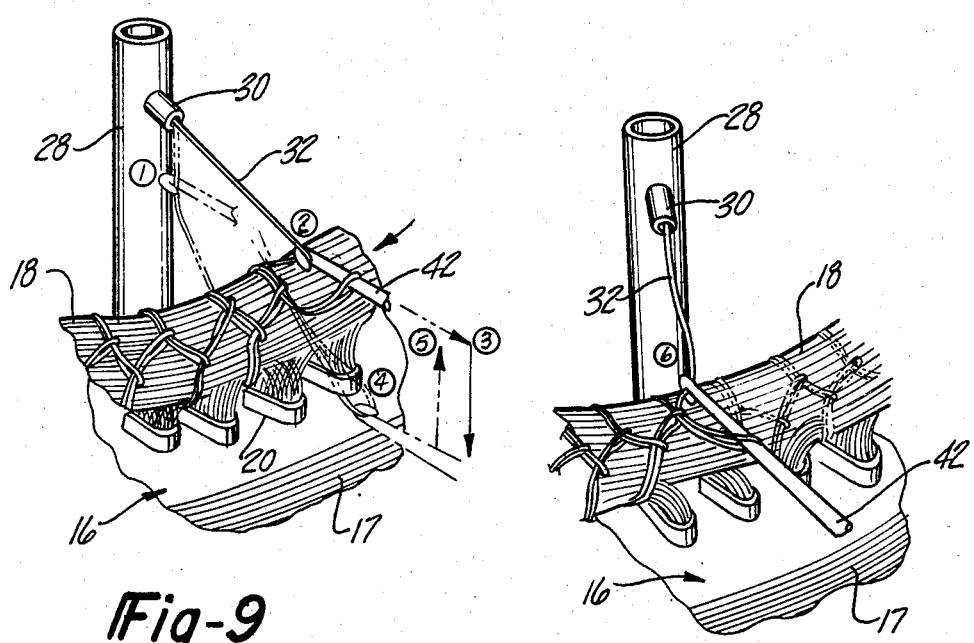
Fig-9
Fig-10
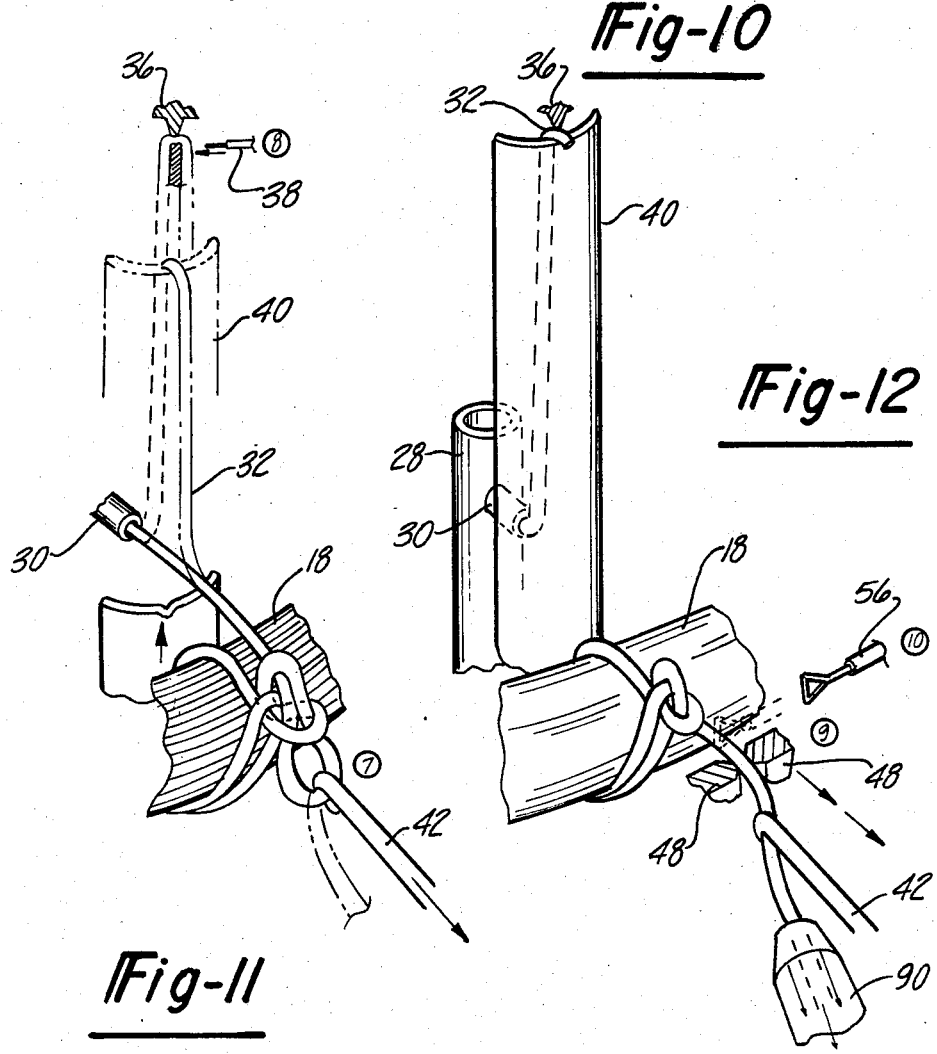
Fig-11
Fig-12

STATOR COIL LACING CORD SECURING APPARATUS AND METHOD

BACKGROUND AND SUMMARY OF THE INVENTION

This invention relates to cord wrapping and tying, and particularly to a device and method adapted for securing the end windings of the stator of an electrodynamic machine and tying a knot in the cord to secure it.

Numerous types of electrodynamic machines such as induction and synchronous type alternating current electric motors, generators, etc., include a stator having a metallic core with a multitude of windings running therethrough which develop magnetic fields necessary for operation of the device. Typically, these windings become bundled together at the axial ends of the stator. It has been found that the efficiency of the machine can be enhanced if these end windings are tightly bound together. It is further desirable to bind the end windings to prevent their interfering with other components of the device, and to properly place the windings in contact with thermally sensitive elements typically used for machine overheating protection. Automated machinery for lacing the end windings of stators are currently known. For example, U.S. Pat. No. 3,685,470, which is herein incorporated by reference, is assigned to the assignee of this invention, Link Engineering Company, and describes a machine for stator lacing. The machine described by the above-identified Link patent employs a lacing needle which interacts with a cord supply finger located within the stator bore to form loops of lacing cord around the end windings of the stator as the stator is rotatably indexed. However, with this machine and many other existing devices designed to perform this task, it is necessary for the operator to manually knot the free end of the lacing cord at the completion of the lacing sequence to prevent the cord from unravelling. The necessity for this manual procedure adds to direct labor costs, increases production cycle time, and can lead to reliability problems.

In view of the above, it is an object of this invention to provide a device and method for automatically securing the lacing cord used to bind the end windings of a stator by tying a knot in the cord at the completion of the lacing cycle. It is another object of this invention to provide such cord securing operation without substantial modification to existing lacing machinery and to provide a high degree of reliability. It is another object of this invention to provide a securing knot in lacing cord using the same machine which performs the lacing operation. It is a further object of this invention to provide additional improvements in stator lacing machines according to the prior art such as that described by the above-mentioned previously issued U.S. patent.

The above objects of this invention are achieved by providing a stator coil lacing machine having an automated control system which permits the lacing operation to proceed normally until a final lacing step at which time the rotational indexing motion of the stator ceases. The lacing needle is then controlled to undergo several steps which form the cord knot, and cause the free end of the cord to be pulled tight by a cord clamp to secure the knot. At the conclusion of the lacing cycle, the lacing cord is repositioned in the machine to enable the cycles to be repeated once a new stator is loaded in the machine. The lacing cord knot is formed without requiring substantial modifications to lacing machines constructed in accordance with the teachings of the prior art.

Additional benefits and advantages of the present invention will become apparent to those skilled in the art to which this invention relates from the subsequent description of the preferred embodiments and the appendend claims, taken in conjunction with the accompanying drawings.

BRIEF DESCRIPTION OF THE DRAWINGS

FIGS. 9 through 12 are pictorial views of the stator coil lacing machine in various stages of forming the end securing knot in the lacing cord.

DETAILED DESCRIPTION OF THE INVENTION

Figure 1:
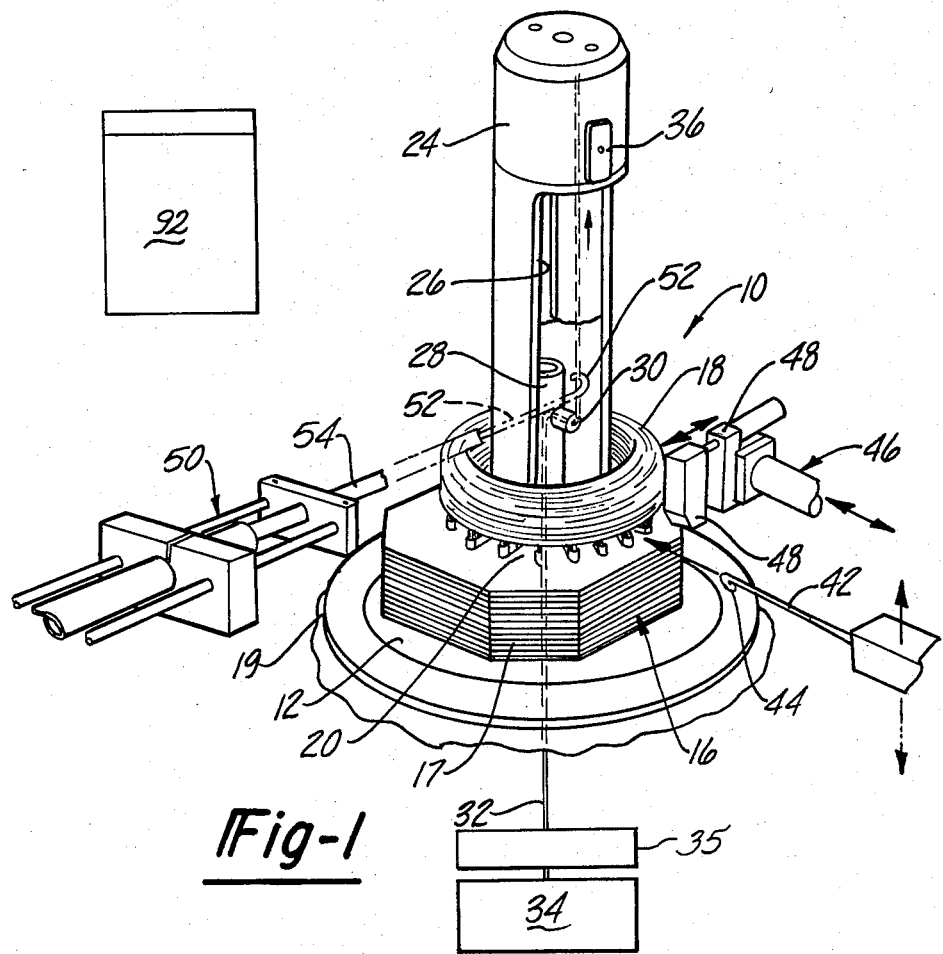
FIG. 1 is a pictorial view of a portion of the stator coil lacing machine according to this invention showing a stator workpiece loaded in position and further showing various lacing cord handling components of the machine.
Figure 2:
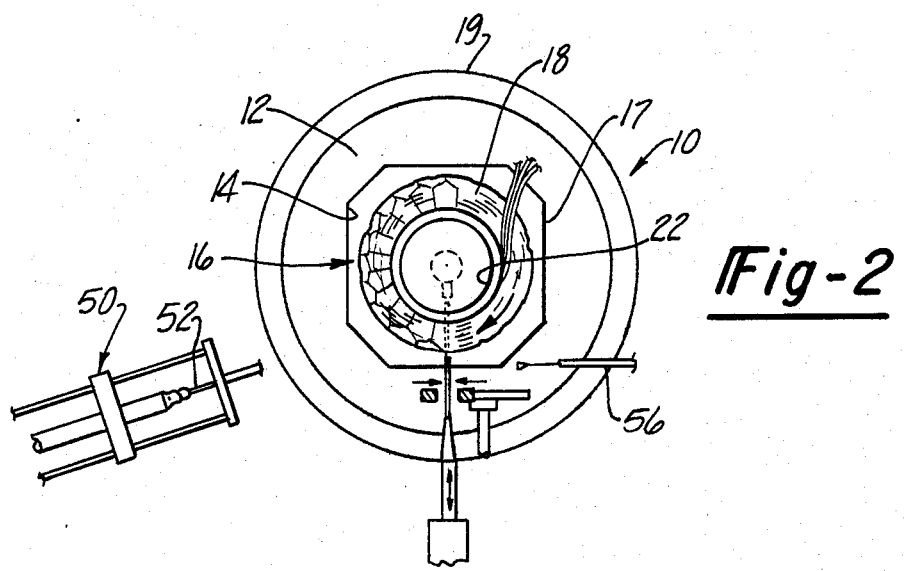
FIG. 2 is a top elevational view of the stator coil lacing machine shown in FIG. 1.
Figure 3:
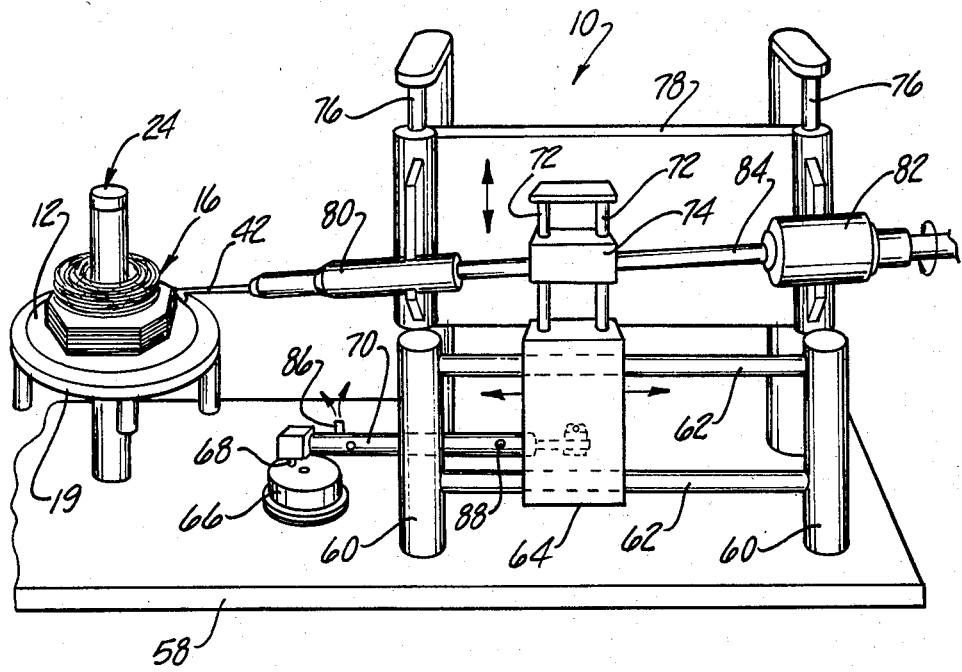
FIG. 3 is a pictorial view of a number of the operational components within the stator coil lacing machine which control motion of the lacing needle.

A stator coil lacing machine according to this invention is shown partially in FIGS. 1–3 and is generally designated there by reference number 10. Stator coil lacing machine 10, as illustrated by the figures herein, is substantially identical with that described by the previously identified U.S. patent previously granted to the assignees of this invention; therefore, only those components which relate to the novel features of this invention will be described in detail in this specification. Further, this specification describes a machine and method adapted to lace and secure only one of the two windings of a typical stator component. In practice, stator coil lacing machines would include mechanisms to simultaneously lace both end windings. These "double ended machines" employ substantially identical components for lacing each end and therefore a description of a machine which laces one end only will suffice for either type of machine.

The figures show turntable 12 having an internal aperture 14 which closely receives stator 16 to thereby rotationally position the stator. Stator 16 is characterized as having a metal core 17 formed of stacked plates with conducting wires oriented axially through the core which converge into a generally toroidal shaped end winding 18. The end windings 18 are spaced from the axial end surface of core 17 to define a plurality of generally radially spaced openings 20. Openings 20 are typically oriented in a true radial direction. Certain stators 16, however, have openings 20 which enter skewed from a true radial direction. Core 17 defines a bore 22 extending between the axial ends of the core. Locating means (not shown) are preferably provided which axially position stator 16 relative to turntable 12. Turntable 12 is rotatably mounted within stationary ring 19 and intermeshes with a gear or other drive system to indexably rotate turntable 12 and stator 16. In accordance with the previously indentified U.S. patent, a drive system known as a "geneva drive" may be employed which converts a constant rotation drive input to an indexing rotation output. This drive mechanism would position stator 16 in proper positions for lacing operations. In preferred embodiments of this invention, other types of indexing drive mechanisms would be employed such as electronically controlled stepper motor drive units. However, any type of indexing motion drive system could be employed.

Centrally disposed within turntable 12 and extending axially through stator bore 22 is center tube 24 which defines an axially extending aperture 26. Concentrically located within center tube 24 is cord supply tube 28 having radially extending tubular finger 30. Lacing cord 32, which is typically twisted or braided and made from synthetic or natural materials, is drawn from a cord supply 34 and is conducted through tubular finger 30. Cord supply 34 preferably includes a cord tensioning means 35 to maintain a predetermined level of tension of cord 32. Cord supply tube 28 is caused to undergo axial and rotational movement through actuation by a gear drive system as best explained in the above-identified issued patent. Center tube 24 further includes cord clamp 36 and cord cutting hot wire 38 in an upper portion thereof. Cord clamp 36 is controllable to clamp and unclamp cord 32, whereas cord cutting hot wire 38 cuts the cord as needed. Concentrically arranged around cord supply tube 28 is axially movable cord positioning tube 40 which is movable to intercept cord 32 and position the cord into cord clamp 36 at the conclusion of the lacing cycle, in accordance with the operating sequence explained in detail below.

A number of components are further employed which interact with lacing cord 32 to perform the lacing operation. These elements include lacing needle 42 which moves axially and radially with respect to stator 16 and is further caused to undergo rotational motion through actuation by the drive system described in detail by the previously identified issued U.S. patent. Lacing needle 42 has a hooked end engageable with cord 32 to pull the cord during the lacing and tying operation. Cord clamp assembly 46 can be actuated to grasp the lacing cord and further to tension the cord in a radially outward direction. Cord clamp assembly 46 includes a pair of jaws 48 which are actuated to clamp or unclamp cord 32. Cord clamp assembly 46 further is actuated to move away from or toward stator 16. Cord offset hook assembly 50 is also configured to engage cord 32 and includes cord offset hook needle 52 and jacket 54 and is axially actuated by a pneumatic cylinder or other actuating device. Jacket 54 is movable axially with respect to needle 52 to firmly grasp cord 32 and to provide friction when cord 32 is pulled with respect to needle 52. FIG. 2 further illustrates cord removal hot wire 56 which is axially movable and can be electrically heated to cut cord 32.

FIG. 3 illustrates a number of components of lacing machine 10 which actuate lacing needle 42. As shown by that figure, a chassis plate 58 is provided which forms a mounting location for center tube 24 and ring 19. Chassis plate 58 also provides a platform for supporting a number of machine components which interact to provide the complex motion required for lacing needle 42. In order to complete the lacing cycle, needle 42 must be actuatable to move linearly along its own longitudinal axis, and axially with respect to the longitudinal axis of stator 16 and further, must be rotatable about its own axis in order to perform the desired lacing motion. This complex motion is provided by the interaction of a number of relatively movable elements attached to chassis plate 58. Movement of needle 42 in a radial direction with respect to stator 16 is provided by employing a pair of vertically extending posts 60 which provide mounts for horizontal slide bars 62. Block 64 is movable along slide bars 62 by providing linear motion bearings therein. Block 64 is caused to oscillate by rotating crankshaft 66 having a radially offset drive pin 68. A connecting link in the form of a pneumatic cylinder 70 connects drive pin 68 with block 64. As crankshaft 66 is rotated, a reciprocal linear movement is imparted to block 64. Attached to the upper portion of block 64 is another pair of slide bars 72 which enables relative vertical movement of slide block 74 along slide bars 72.

Movement of lacing needle 42 in the direction of the longitudinal axis of stator 16 is provided by employing another pair of slide bars 76 extending in a vertical direction along which frame 78 is moved. Frame 78 is connected to collar 80 and cylindrical housing 82. Frame 78 is driven for vertical movement by a drive system located beneath plate 58. As frame 78 is moved linearly, a gear rack (not shown) interacts with a spur gear connecting to needle bar 84 within cylindrical housing 82 to impart the desired rotational movement. The above described components provide the complex motion desired for lacing needle 42. Rotation of crankshaft 66 causes linear motion of block 64 which is imparted to block 74 which engages needle bar 84. This movement, therefore, causes lacing needle 42 to move in a radial direction. Vertical movement of frame 78 acts upon collar 80 and housing 82 to provide the desired motion of lacing needle 42 along an axis parallel to the longitudinal axis of stator 16. This motion simultaneously provides a rotational movement which is imparted to needle bar 84. The above description of lacing machine 10 varies principally from that described by the previously identified patent in that pneumatic connecting link 70 includes a pair of ports 86 and 88 which enable the distance between drive pin 68 and block 64 to be changed in response to signals from a programmable controller. The provision of pneumatic connecting link 70 enables the knot tying sequence to be performed which will be described below.

Figure 4:
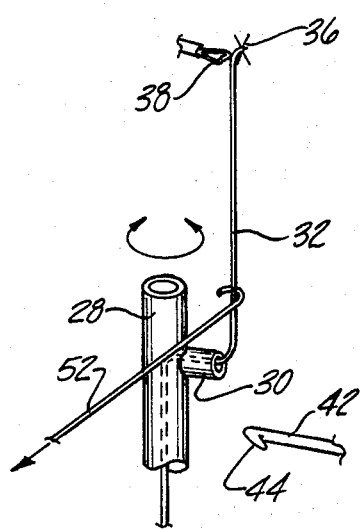
FIG. 4 is a pictorial view showing the cord supply tube, the tubular finger, the cord removal hot wire, the cord clamp, the cord offset hook, and the lacing needle.
Figure 5:
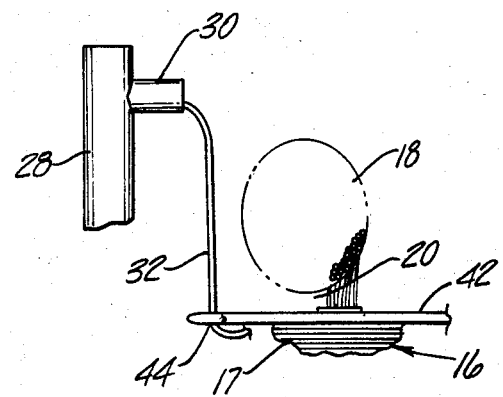
FIGS. 5, 6 and 7 are cross sectional views showing the stator end windings and the lacing needle in successive progressing positions during the lacing cycle wherein the lacing needle is inserted adjacent one end of the winding to intercept the lacing cord, withdrawn, moved axially to another end of the windings, and again inserted to intercept the lacing cord.
Figure 6:
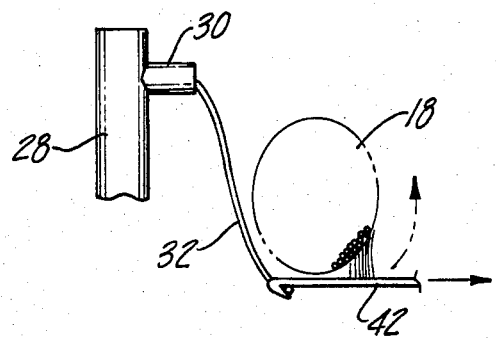
Figure 7:
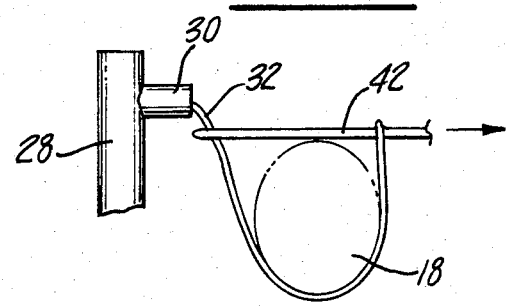
Figure 8:
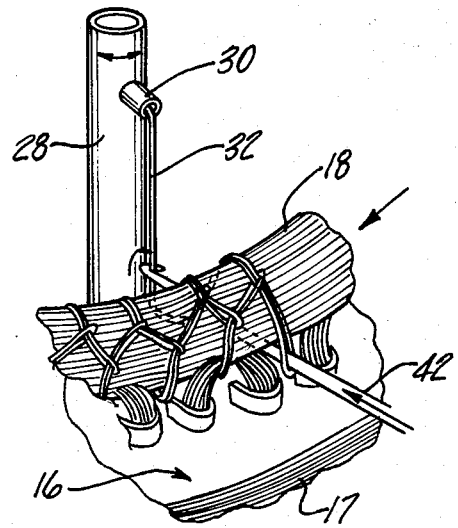
FIG. 8 is a pictorial view of a portion of the stator end windings showing the interaction between the tubular finger and lacing needle during the lacing operation and further showing a number of formed lacing wraps.

The operation of stator lacing machine 10 will now be described with reference to FIGS. 4–12. FIG. 4 represents an initial position of lacing cord 32 shown schematically as being clamped by cord clamp 36, representing a starting point for the lacing cycle. Thereafter, stator 16 is loaded into position within turntable 12 and cord offset hook assembly 50 is caused to engage lacing cord 32. As shown in FIG. 5, lacing needle 42 is then caused to be radially inserted into stator 16 within an opening 20 below end windings 18 and engages lacing cord 32. FIG. 6 illustrates lacing needle 42 being retracted, thereby pulling a loop of cord in a radially outward direction. Then, as shown in FIG. 7, needle 42 is moved to the opposite end of end windings 18 and then reinserted to again engage cord 32, and is retracted to pull an additional loop of cord through the first loop. Cord clamp 36 now releases lacing cord 32. This operation proceeds in the manner described above and provides the interlacing binding of lacing cord as shown in FIG. 8. The movement of lacing needle 42 and tubular finger 30 is coordinated to properly cause engagement between the lacing needle and lacing cord, yet prevent the needle from engaging previously formed loops of cord or the stator coil end windings 18. The free end of lacing cord 32 which was released from cord clamp 36 and positioned by cord offset hook 50 becomes "laced under", thereby securely restraining this free end of the cord. Throughout the lacing cycle, stator 16 is indexably rotated such that lacing needle 42 is inserted within the desired openings 20. Such rotational indexing need not be uniform; for example, it may be desired to provide two or more laces at one stator radial location before continued indexing is permitted in order to securely wrap certain portions of the stator winding, for example, for firmly engaging a thermal sensitive element or to securely bind lead wires to the coil end winding 18.

FIGS. 9 through 12 illustrate the operation of the components of machine 10 in forming the cord securing knot in accordance with this invention. Various positions of the components are shown in these figures and the sequence is shown with reference to component positions designated by circled reference numbers 1 through 10. The knot securing cycle begins at the completion of the lacing sequence such that a number of interengaging laces are formed as shown in FIG. 9. Position 1 shows lacing needle 42 inserted over the top of coil end windings 18. Position 2 shows the cord being pulled, forming a loop. The loop is pulled through a previously formed loop in Position 3 and moved axially with respect to stator 16. Position 4 designates the downward motion of lacing needle 42 in a direction parallel to the longitudinal axis of stator 16 and the lacing needle again being moved in a direction to be inserted within an opening 20. In accordance with this invention, the normal lacing motion of lacing needle 42 is interrupted such that lacing needle 42 does not enter radially inward through end windings 18 to again intercept lacing cord 32. Instead, lacing needle 42 dwells in this position. Position 5 designates the lacing needle being raised. Now referring to FIG. 10, in sequence Position 6, lacing needle 42 is inserted to again intercept lacing cord 32. Thereafter, the loop of cord is pulled as designated by Position 7 in FIG. 11, thereby completing formation of a knot. Once this knot is formed, positioning tube 40 is moved as shown in FIG. 11 from the full line to the phantom line position shown. During this movement, cord positioning tube 40 intercepts lacing cord 32 between tubular finger 30 and end windings 18 and lifts the lacing cord to a position where it is engaged by cord clamp 36. At this point, as indicated by Position 8 the free end of the cord is cut by cord cutting hot wire 38, thereby leaving a free end. As shown in FIG. 12 and designated by Position 9, the lacing needle retracts and cord clamp 46 moves toward end windings 18 and clamps the cord and is caused to move longitudinally saway from the knot, thereby causing initial tension and thereafter is preferably moved toward the knot to introduce slack and again pulled to "set" the knot. Position 10 designates cord removal hot wire 56 moving longitudinally to burn off the end of the lacing cord which is removed by vacuum pickup 90.

The above described operation of the stator coil lacing machine is provided through the use of a machine substantially identical with that described by the above-identified issued patent. The modification necessary to perform the knot tying sequence is to prevent lacing needle 42 from being radially inserted during sequence number 4. This operation is provided through controlling air or other fluid signals to pneumatic connecting link 70 shown in FIG. 3. Crankshaft 66 is continuously rotated; however, when it is desired to prevent insertion of the lacing needle, the effective length of cylinder 70 is increased by providing a fluid pressure source to port 86. Once this is accomplished, rotation of crankshaft 66 does not result in the insertion of lacing needle 42 within opening 20. The air or fluid pressure sources for cylinder 70 are preferably controlled through a microprocessor based programmable controller 92 shown schematically in FIG. 1 or other sequential controlling system and may be initiated or controlled by limit switches which sense the position of turntable 12 or any other element of the system. Since both the lacing and knot tying steps are completed on the same machine 10, this invention facilitates highly automated production techniques which include component handling equipment to load and unload workpieces without requiring manual operations.

While the above description constitutes the preferred embodiments of the present invention, it will be appreciated that the invention is susceptible to modification, variation and change without departing from the proper scope and fair meaning of the accompanying claims.

What is claimed is:

1. A method of wrapping lacing cord around generally toroidal shaped end windings of a component of an electrodynamic machine and knotting the cord, using a lacing machine of the type having a lacing cord supply, a lacing needle, and means for rotatably indexing the end windings, said method enabling both said wrapping and said knotting to be accomplished using said lacing needle, comprising the steps of:

extending said lacing needle in a generally radial direction along a first axial end of said end windings and engaging said lacing cord, retracting said lacing needle thereby forming a first lacing cord loop, moving said lacing needle axially with respect to said end winding, extending said lacing needle in a generally radial direction along a second axial end of said end winding and engaging said lacing cord, retracting said lacing needle thereby forming a second lacing cord loop which is pulled through said first loop, extending said lacing needle in a generally radial direction along said second axial end of said end winding and engaging said lacing cord, retracting said lacing needle and pulling said lacing cord through said second loop, cutting said lacing cord thereby forming a free cord end, retracting said lacing needle and pulling said free cord end through said second loop, thereby forming a knot, and pulling said free cord end to secure said knot.

2. The method according to claim 1 using a lacing machine of the type which further includes means for rotationally indexing said end windings and further comprising the steps of:

rotationally indexing said end winding during or between any of said steps.

3. The method according to claim 2 using a lacing machine of the type which further includes a turntable having means to rotationally index said end windings.

4. The method according to claim 1 using a lacing machine of the type which further includes means for indexing the end windings and further comprising the steps of;

grasping said lacing cord after said step of retracting said lacing needle and pulling said free cord end through said second loop, relieving tension of said lacing cord after said pulling step, and pulling said free cord end a second time to further secure said knot.

5. The method according to claim 1 wherein the component of the electrodynamic machine includes a pair of separated end windings and said steps are undertaken for both of said end windings.

6. The method according to claim 1 further comprising the step of:

cutting the lacing free cord end adjacent said knot following said pulling step.

7. In a machine for wrapping lacing cord around a generally toroidal shaped end windings of a component of an electrodynamic machine and knotting the cord of the type including a turntable having an aperture for mounting said component, means for rotationally indexing said turntable, a cord supply finger, cord supply finger actuation means for causing rotation and linear motion of said cord supply finger, a lacing needle, lacing needle actuation means for moving said lacing needle, the improvement comprising:

controller means for causing said cord supply finger actuation means and said lacing needle actuation means to undergo the following steps: extending said lacing needle in a generally radial direction along a first axial end of said end windings to engage said lacing cord, retracting said lacing needle forming a first lacing cord loop, moving said lacing needle axially to a second axial end of said end windings, extending said lacing needle and engaging said lacing cord, retracting said lacing needle thereby forming a second lacing cord loop which is pulled through said first loop, extending said lacing needle in a generally radial direction along said second axial end of said end windings to engage said lacing cord, retracting said lacing needle thereby pulling said lacing cord through said second loop and thereby forming a knot, and cutting said lacing cord.

8. The machine according to claim 7 wherein said controller means is a microprocessor based programmable controller.

9. The machine according to claim 7 further comprising: means for tensioning said lacing cord.

10. The machine according to claim 7 wherein said controller means causes said turntable to be rotatably indexed, thereby forming said cord loop around the entire periphery of said end windings.

11. The machine according to claim 7 further comprising a cord clamp assembly which grasps and pulls the lacing cord after the cord is pulled through said second loop to tighten said knot.

12. The machine according to claim 11 wherein said controller means causes said cord clamp assembly to relieve tension on said lacing cord and pulls said lacing cord a second time to firmly set said knot.

13. In a machine for wrapping lacing cord around the end windings of a stator having a central longitudinal bore and automatically knotting the end of said lacing cord after said end windings of said stator has been completely wrapped, using a machine of the type including means for rotatably indexing said stator, lacing cord supply means located in said stator bore, and a lacing needle movable axially and radially with respect to said stator for engaging said lacing cord and drawing said lacing cord radially outward to define loops of said lacing cord which become intertwined to wrap said end windings, and the improvement comprising:

controller means for controlling said means for indexing, said lacing cord supply means, and said lacing needle, said controller means upon completion of wrapping of said end windings being operable to actuate said lacing needle to engage said lacing cord and knot said cord by pulling said lacing cord through the last loop of said lacing cord formed during said wrapping, said controlling means controlling axial movement of said lacing needle by modulating fluid flow to a fluid activated cylinder which positions said lacing needle.

* * * * *